United States Patent [19]
Kadle

[11] Patent Number: 5,111,671
[45] Date of Patent: May 12, 1992

[54] EVAPORATOR WITH EXPANDING AND CONTRACTING PASSES FOR IMPROVING UNIFORMITY OF AIR TEMPERATURE DISTRIBUTION

[75] Inventor: Prasad S. Kadle, Getzville, N.Y.

[73] Assignee: General Motors Corporation, Detroit, Mich.

[21] Appl. No.: 651,878

[22] Filed: Feb. 7, 1991

[51] Int. Cl.$^5$ .............................................. F25B 39/02
[52] U.S. Cl. ..................................... 62/515; 165/150
[58] Field of Search ................... 62/515; 165/150, 153

[56] References Cited

U.S. PATENT DOCUMENTS

| | | | |
|---|---|---|---|
| 4,212,350 | 7/1980 | Andreoli | 165/129 |
| 4,354,551 | 10/1982 | Kristoffersson et al. | 62/515 |
| 4,690,209 | 9/1987 | Martin | 165/150 |
| 4,712,611 | 12/1987 | Witzel | 165/122 |
| 4,877,083 | 10/1989 | Saperstein | 165/176 |
| 4,901,791 | 2/1990 | Kadle | 165/150 |
| 4,936,379 | 6/1990 | Hoshino et al. | 165/150 |
| 4,962,811 | 10/1990 | Yamamoto | 165/150 |

FOREIGN PATENT DOCUMENTS

61-295492 12/1986 Japan.

*Primary Examiner*—Ronald C. Capossela
*Attorney, Agent, or Firm*—Ronald L. Phillips

[57] ABSTRACT

A refrigerant evaporator for an air conditioning and ventilating system for a motor vehicle has an evaporator with an air inlet face which receives a non-uniform air flow pattern from a radial air blower of the ventilating system and which evaporator further includes refrigerant passes with flow areas and volumes selected to contract the refrigerant flow at the outlet of the evaporator thereby to produce more refrigerant cooling in the portion of the evaporator core which receives higher air flow so as to produce a more uniform outlet air temperature from the evaporator.

7 Claims, 5 Drawing Sheets

EVAPORATOR WITH EXPANDING AND CONTRACTING PASSES FOR IMPROVING UNIFORMITY OF AIR TEMPERATURE DISTRIBUTION

FIELD OF THE INVENTION

This invention relates to a motor vehicle air conditioning systems and more particularly to such systems having a refrigerant evaporator that receives an uneven inlet air pattern from an air blower for supplying air to the evaporator for cooling and distribution into the passenger compartment of a motor vehicle.

BACKGROUND OF THE INVENTION

One problem with motor vehicle air conditioning systems is caused by air blowers which direct air across the inlet face of a refrigerant evaporator located in a duct system for distributing cooled air from the evaporator through outlets either on the passenger side or the driver side of the vehicle. In such arrangements space limitations are such that the downstream diffuser section from the blower will not produce a uniform air flow pressure at the inlet face of the evaporator unit. Accordingly, more air flow will pass through one portion of the evaporator than another portion thereof.

In the past, such evaporators have included fluidly connected refrigerant passes which expanded in volume from the inlet to the outlet of the evaporator. The passes of the refrigerant evaporator expanded in volume at a rate which accommodated greater volume of refrigerant caused by vaporization of the liquid refrigerant in the evaporator. The increasingly larger volume passes enabled the vaporized refrigerant to flow through the passes so, as to minimize pressure drop across the evaporator while maximizing heat transfer performance between the air side and refrigerant sides of the refrigerant evaporator.

While suitable for improving overall heat transfer performance, such continuously expanding refrigerant passes are not arranged or configured to produce uniform cooling of uneven air flow patterns through the air side of an evaporator core.

U.S. Pat. No. 4,712,611 discloses a ventilation unit for heating or cooling a motor vehicle. It includes a diffuser plate downstream of a radial type air blower to more uniformly spread the flow air to the peripheral portions of an evaporator. While the air flow pattern is improved, the arrangement requires the addition of an obstruction in the duct work for directing conditioned air to the vehicle interior thereby to reduce the efficiency and performance of the primary air distributor in the system. Furthermore, the diffuser is susceptible to plugging and it constitutes an additional part in the system.

It is also known to provide an evaporator in which the refrigerant flow path is modified by use of a central rib defining a U-flow passage formed between two flat and elongated plates defining a tube pass between inlet and outlet openings at one end of the joined plates. The modified refrigerant flow path is not arranged to compensate for uneven air flow distribution across the inlet face of the air side of the evaporator.

U.S. Pat. No. 4,212,350 discloses a heating system in which a radial drum impeller discharges into a vertical channel having exchange fins therein to create turbulence to improve the heat exchange surface area at the air intake to the channel.

U.S. Pat. Nos. 4,936,379; 4,877,083 and Japanese Utility Model Publication Bulletin 1986 (Showa 61) -295,492 all show heat exchangers with S-shaped flow patterns.

None of the aforesaid arrangements, however, are employed for the purpose of contracting refrigerant flow in an evaporator whereby higher air flow patterns at the inlet face of a refrigerant evaporator have a greater loss of energy in the evaporator whereby air flow exiting the evaporator has a more even temperature gradient.

SUMMARY OF THE INVENTION

The present invention includes a evaporator having its tube passes expanded and then contracted to distribute refrigerant in a pattern which will locate greater refrigerant cooling at higher air flow portions of an evaporator so as to evenly cool uneven air flow patterns directed through the evaporator.

More particularly, a feature of the present invention is to provide a refrigerant evaporator having refrigerant passes therein arranged to first expand and then contract in volume to distribute refrigerant within the core of the evaporator and to retain greater amounts of liquid refrigerant at the high air flow portions of the evaporator to produce greater air cooling at the higher air flow regions of the evaporator to produce a more uniform temperature throughout the air exiting the evaporator for flow through into the passenger compartment of a motor vehicle.

A further feature of the present invention is to provide a refrigerant evaporator in an air conditioning and ventilating unit of a motor vehicle wherein the refrigerant evaporator has an inlet face receiving inlet air from an air blower which directs more air through a first portion of the evaporator and a lesser air flow through a second portion of the evaporator and wherein the evaporator has first and second refrigerant passes connected in fluid flow relationship for expanding refrigerant flow in the first pass while contracting refrigerant flow in the second pass so as to distribute the liquid phase of the refrigerant so as to locate more cooling at the first portion of the evaporator for producing a more uniform air temperature in the air exiting the evaporator prior to discharge thereof into the passenger compartment of a motor vehicle.

An object of the present invention is to provide a refrigerant evaporator as set forth in the preceding summary of the invention wherein the evaporator includes a refrigerant pass having a first volume and flow cross-section which expands to accommodate vaporization of refrigerant and further includes a refrigerant pass at the outlet of the evaporator having a second volume and flow cross-section to contract the refrigerant flow whereby more liquid refrigerant phase is maintained at the portion of the evaporator having higher air flow thereacross so as to even the temperature of air exiting the air side of the evaporator.

Still another object of the present invention is to provide a refrigerant evaporator as set forth in the preceding paragraph wherein the refrigerant passes include flat tubes formed from thin elongated plates having a refrigerant passage formed therebetween and wherein the air side of the evaporator is defined by air centers located in conductive heat transfer relationships with opposed outer surfaces of spaced adjacent ones of said tube passes.

Still another object of the present invention is to provide a refrigerant evaporator as set forth in the preceding paragraph wherein each of the flat tubes have either an inlet opening at one end and an outlet opening at the opposite end or the flat tubes have a U-flow passage formed between an inlet opening and an outlet opening at the same end of the flat tube.

Yet another object of the present invention is to provide for more uniform cooling of air flow through a refrigerant evaporator by the provision of a tube pass arrangement with three (or more) refrigerant passes including a first set of tubes formed in parallel; a second set of tubes formed in parallel to define an expanding refrigerant volume in series flow relationship with the first set of tube passes, and a third set of tubes formed in parallel to define a contracting refrigerant volume in series flow relationship with the second set of tubes whereby more liquid phase refrigerant is retained in the flow path of higher air flow through the evaporator for producing a more uniform air temperature from the evaporator prior to flow into the passenger compartment of a motor vehicle.

Still another object of the present invention is to provide a refrigerant evaporator for use in motor vehicle air conditioning and ventilation systems wherein the evaporator is comprised of a first set of U-flow plate type tubes having a refrigerant flow path which expands between the inlet and outlet openings therein to reduce pressure drop and a second set of U-flow plate type tube having a refrigerant flow path which contracts between the inlet and outlet openings of the U-flow plate to maintain more liquid refrigerant at the higher air flow portions of the evaporator so as to produce a more uniform temperature in the air flow exiting the evaporator for flow into the passenger compartment of the motor vehicle.

These and other features, objects and advantages of this invention will become more apparent from the detailed description and drawings in which:

DETAILED DESCRIPTION OF PREFERRED EMBODIMENTS OF THE INVENTION

Figures 1, 2:
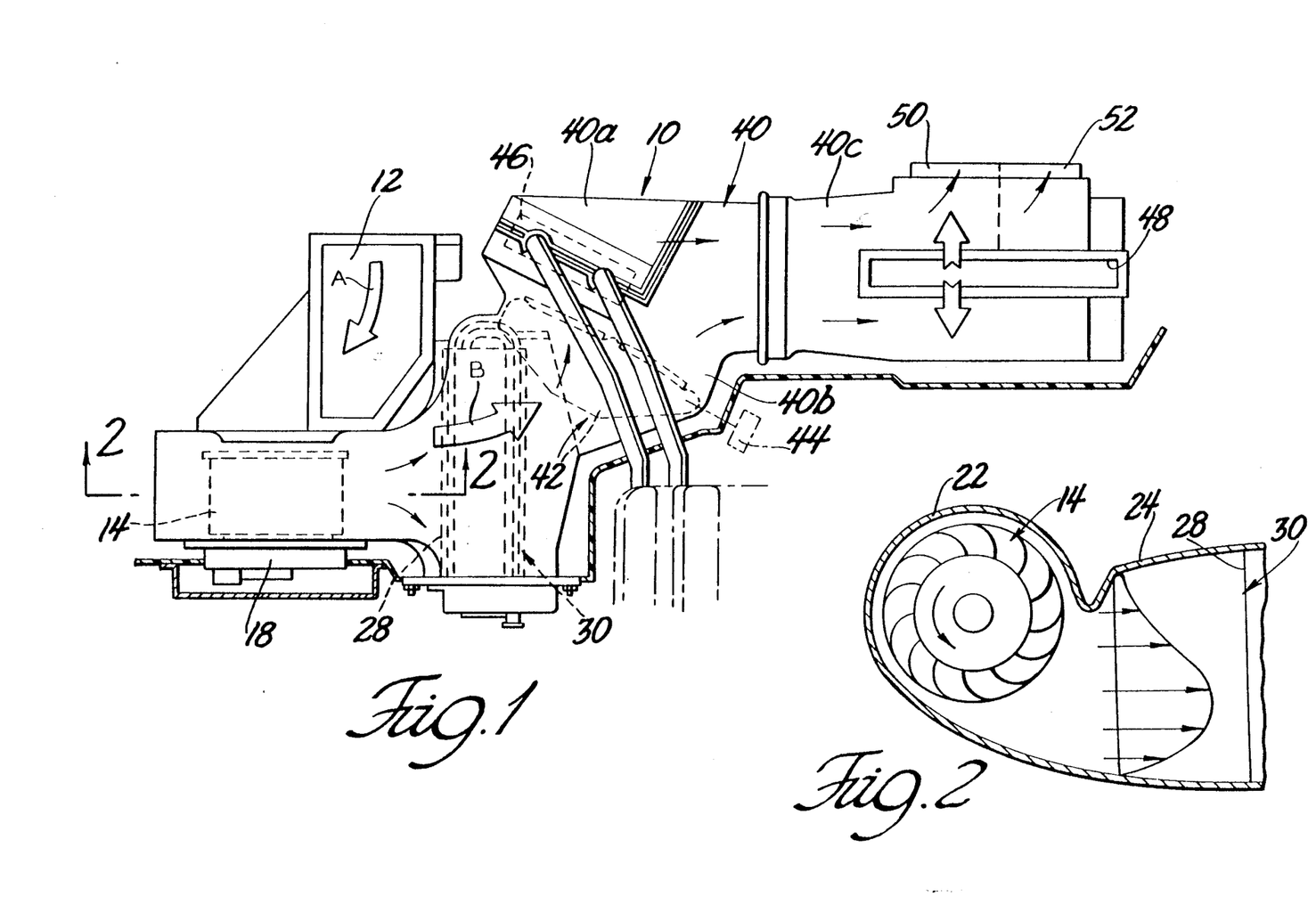
FIG. 1 is a top elevational view of a heating, ventilating and air conditioning system for a motor vehicle including a refrigerant evaporator constructed and arranged in accordance with the present invention.
FIG. 2 is an enlarged fragmentary sectional view taken along the line 2—2 of FIG. 1.

Referring now to FIGS. 1 and 2 a heating, ventilating and air conditioning system 10 is shown for conditioning the air flow into the passenger compartment of a motor vehicle. For purposes of the present invention it is only necessary to describe such systems 10 in general terms with it being understood that the system includes a plurality of interfitted plastic housing components of plastic material or other suitable composition material. The housing components include an air intake 12 for flow of air as shown by arrow A. The air is drawn through the air intake 12 by an electrically powered rotary blower 14 having a radial flow centrifugal impeller 16 connected to a brushless drive motor 18. The motor 18 is mounted on a housing 20 including a scroll segment 22. The scroll segment 22 discharges compressed air into a diffuser segment 24 which is shortened to be accommodated within limited space confines of a motor vehicle upstream of an evaporator housing segment 26 of the system 10. As shown in FIG. 2 the air discharge pattern from the blower 14 is uneven and the shortened length of the diffuser segment 24 is unable to even the flow pattern before the blower discharge pattern is directed through the inlet face 28 of an evaporator 30 constructed in accordance with the present invention to adjust the location of refrigerant within the evaporator 30 in accordance with the uneven air flow pattern thereacross.

Figure 3:
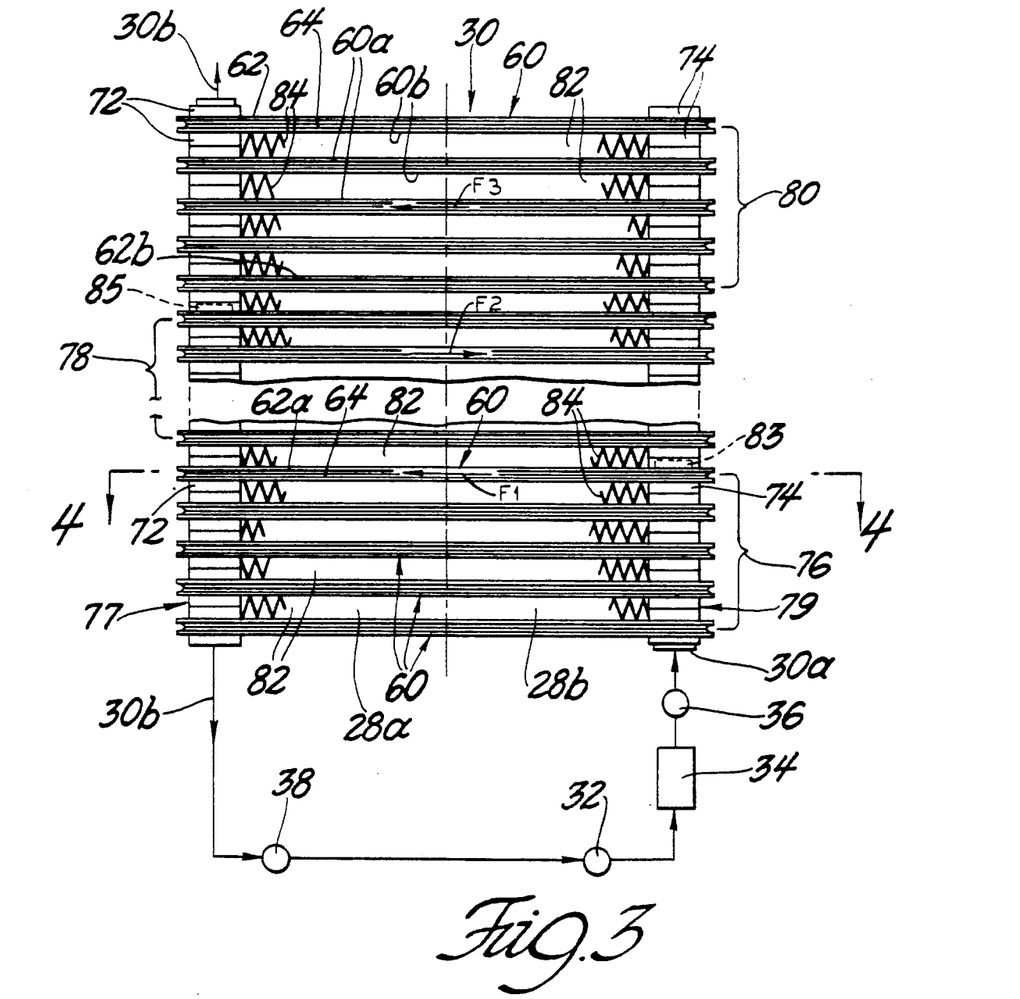
FIG. 3 is a front elevational view of an evaporator including the present invention.

The refrigerant evaporator 30 is part of a known refrigerant system, diagrammatically illustrated in FIG. 3 as including a compressor 32 adapted to be selectively connected to the engine of the motor vehicle. The compressor compresses low temperature. low pressure refrigerant from the evaporator 30 and discharges high temperature vapor under pressure into a condenser 34 located in the inlet airstream of the motor vehicle or arranged to be cooled by a mechanical blower such as the engine cooling fan. The high pressure vapor refrigerant is condensed in the condenser and is directed therefrom through a high pressure liquid refrigerant line to a capillary tube or expansion device shown schematically at 36. The low pressure liquid refrigerant is then directed into the inlet of th evaporator 30 where it is distributed through tube passes for vaporization by the heat flow from air directed thereacross. Low pressure refrigerant vapor is then returned through a dehydrator accumulator unit 38 which is connected by a low pressure vapor conduit to the inlet of the compressor 32.

Accordingly, air flow across the evaporator 30, indicated in FIG. 1 by arrow B, is cooled prior to its passage through downstream housing components 40 of the system 10. For purposes of the present invention it should be understood that the housing components 40 are merely representative of many housing/duct systems suitable for distributing conditioned air into the interior of a motor vehicle. The housing components 40 include a heater housing 40a which receives air either directly or in a bypass mode from a directional control valve 42 located in a valve housing 40b. The heater housing 40a and the valve housing 40b connect to the inlet of a air distributor housing 40c. The valve 42 is operated by an actuator motor 44 for positioning the valve 42 to control air flow across the heater 46 or into the air distribution housing 40c for providing defrost modes, heating modes or air conditioning modes wherein the conditioned air can either be dehumidified and heated and discharged through defrost openings 48 across the glass windshield of a vehicle; or the same air can be directed through director vents 50 and 52 to the driver and passenger sides of the interior of the vehicle.

Again, the illustrated distribution housing is merely representative of a typical duct system which will receive air cooled by the evaporator 30 of the present invention.

One problem in the past is that the uneven air flow pattern which results from radial blowers discharging into short length diffusers is that more air flows through one part of the evaporator than through another part. As shown in FIG. 3, an evaporator 30 is illustrated of the finned cross-flow heat exchanger type such as used as the evaporator in an motor vehicle air conditioning system. The front inlet face 28 is arranged with respect to the diffuser such that there is more air flow on the left side 28a of the center line through the evaporator face 28 and less air flow on the right side 28b of the center line as viewed in FIG. 3.

In the past such evaporators have generally had the refrigerant passes arranged such that the flow passage would expand between the inlet and outlets of the evaporator to accommodate for expansion of liquid refrigerant to a vapor phase thereby to provide adequate flow area to prevent excessive pressure drop between the inlet and outlets of the evaporator. One problem with such arrangements is that the distribution of the refrigerant within the core of the evaporator does not provide enough liquid refrigerant at the portion of the evaporator which has the higher volumes of air flow directed thereacross.

Figure 4:
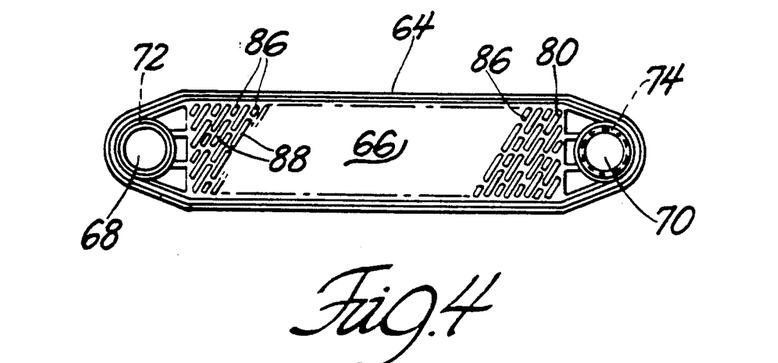
FIG. 4 is a sectional view taken along the line 4—4 of FIG. 3 looking in the direction of the arrows.

In order to overcome this problem the evaporator 30 comprises a plurality of flat tubes 60 formed by thin elongated pairs of plates 62, 64 joined together to form a refrigerant passage 66. In the illustrated arrangement the flat plates 62, 64 each have openings 68, 70 at opposite ends thereof formed by generally conical and truncated protuberances 72, 74 that project outward from the general plane of each of the plates 62, 64. The protuberances 72, 74 are joined to form tanks 77, 79 for refrigerant flow between the flat tubes 60 and between three separate tube passes 76, 78 and 80 to be described.

Each of the flat tubes 60 are spaced from one another to define a flow passage for inlet air directed from the blower 14. The flow passages are designated by reference numerals 82 and each one of the flow passages accommodates a corrugated air center in the form of a sinusoidally formed heat conducting fin 84 which is located in conductive heat transfer relationship with the outer surfaces 60a and 60b of the tubes 60 to increase the heat transfer performance of the heat exchanger between the air side and refrigerant side thereof. A cross-flow of air through the fins 84 loses heat energy to the refrigerant in passages 66. Passages 66 have representatively shown ribs or dimples 86, 88 formed in the plates 62, 64 to improve heat transfer between the air flow and refrigerant. The heat transfer causes liquid refrigerant to boil and vaporize as it flows through the tubes passes of the evaporator core as defined by the tube passes 76, 78 and 80.

In accordance with the present invention, the first pass 76 of the evaporator connects to the inlet 30a of the evaporator. It includes five flat tubes 60 of equal volume, equal cross-section passages 66. The refrigerant flows from inlet 30a through the five tubes 60 in pass 76 in a direction designated by the arrow F-1 between protuberances 74 forming inlet tank 79 of the tube pass 76 for flow into a collection tank 77 formed by protuberances 72 on the opposite side of the evaporator 30. The opening 70 from a plate 62a is blocked by a plug 83 to direct the refrigerant flow in the flow direction F-1.

A plug 85 in opening 68 of plate 62b redirects flow in a direction designated by the arrow F-2 through the second pass 78 which is made up of seven flat tubes 60 of equal volume and equal cross-section combined to define an expanding flow passage volume from the total volume of passages 66 in the tubes 60 forming the pass 76. The expanded volume in the seven tubes of pass 78 accommodates fluid expansion in the refrigerant produced by loss of energy from the air flow passage through the high air flow portion 28b and lower air flow portion 28a of the air side of the evaporator 30. The loss of energy causes vaporization of the liquid refrigerant which increases the fluid volume which in turn is accommodated by the greater flow area of the second pass 78 to reduce pressure drop as the refrigerant continues to increase in volume. The last pass 80 of the evaporator 30 has five flat tubes 60 of equal volume and equal cross-section to the tubes 60 previously described with a flow F-3 therethrough to an evaporator outlet. The volume of the tubes 60 in outlet pass 80 is contracted as compared to the flow area through the passes 76, 78 so as to provide a back pressure effect on the expanding refrigerant flow in the passes 76, 78 thereby tending to cause more liquid phase refrigerant to be held in the higher air flow portion 28b of the evaporator 30 during the cooling process. Accordingly, the use of the contracting flow volume and flow area will avoid hot spots in the evaporator core caused by uneven air flows thereacross. The resultant effect is a more uniform temperature as well as increased cooling capacity in the air flow exiting the evaporator 30 prior to passage into the passenger compartment of a motor vehicle.

Figure 5:
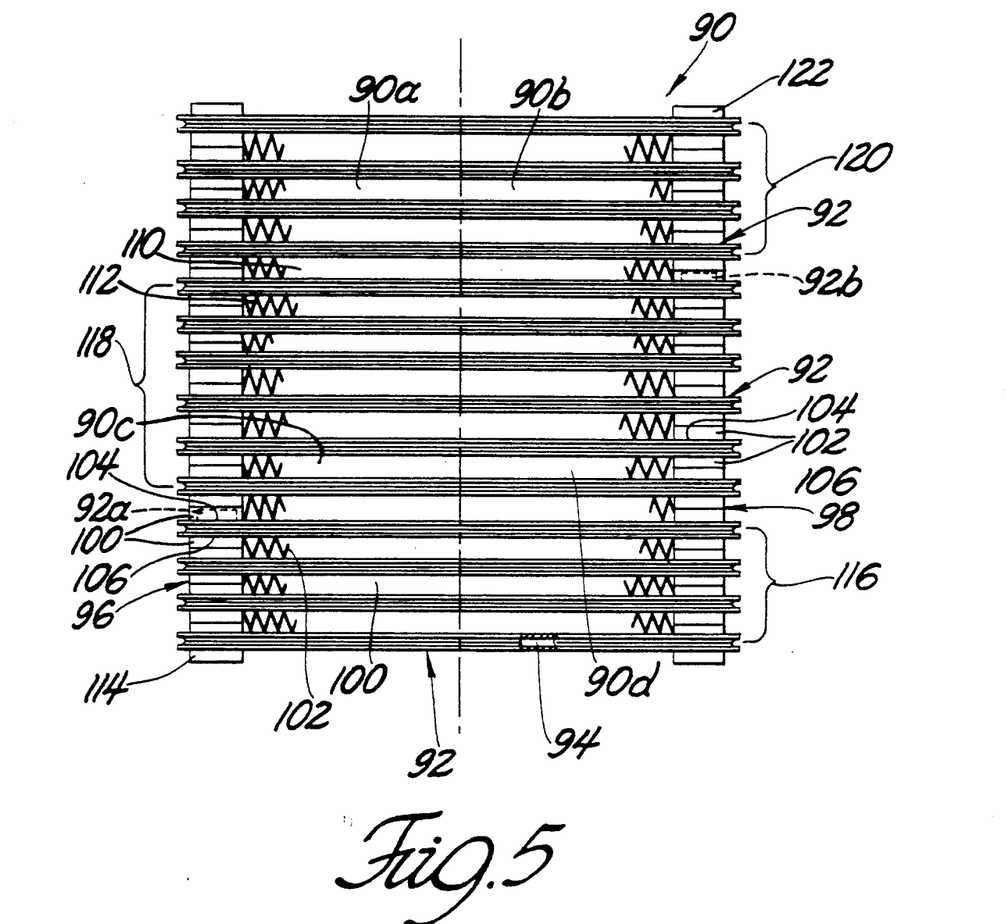
FIG. 5 is a diagrammatic view of the refrigerant flow pattern through another evaporator embodiment of the present invention.

Another embodiment of the invention is shown in FIG. 5 wherein a straight flow refrigerant evaporator 90 is illustrated as having its frontal inlet area divided into four quadrants 90a, 90b, 90c, and 90d. The evaporator 90 is located in a diffuser passage which receives an uneven flow pattern from a blower such as the blower 16. The diagonally opposed quadrants 90a, 90d receive a medium air flow; the quadrant 90c receives air flow at a rate higher than the medium air flow rates through quadrants 90a and 90d; and the quadrant 98b receives an air flow rate which is lower than the rate of air flow through quadrants 90a, 90d. Accordingly, the high rate flow quadrant 90c is diagonally opposed to the low rate air flow quadrant 90b and the intermediate rate flow rate quadrants 90a, 90d are diagonally opposed along a diagonal line crossing through the quadrants 90b, 90c.

The evaporator 90 includes parallel flat tubes 92 each having a refrigerant passage 94 that interconnects tanks 96, 98 at opposite sides of the evaporator which are formed by protuberances 100, 102 on the embossed flat plates 104, 106 that form each of the tubes 92. Each of the plates 104, 106 have opposite end openings (not shown) that correspond to the openings 68, 70 shown in FIG. 3.

As in the first embodiment, the evaporator 90 includes air passages 110 with air centers 112 located therein to direct air across the tubes 92 to lose energy to the refrigerant passing through the evaporator 90. The evaporator has an inlet 114 which is adapted to be connected to the high pressure liquid refrigerant conduit through the expansion device. Liquid phase refrigerant is directed through a first pass 116 comprising four flat tubes 92 which communicate with the inlet 114 at the tank 96. The end opening in a flat tube is blocked at 92a so as to flow liquid refrigerant which is partially vaporized as it flows through the tubes 92 to the tank 98. The tank 98 then feeds vaporized refrigerant and liquid refrigerant into a larger cross section flow area and volume defined by a second pass 118 which is comprised of six flat tubes 92 flowing refrigerant from the tank 98 to the tank 96. The end opening in a flat tube is blocked at 92b to define the inlet side of the second pas 118. In accordance with the invention, in order to maintain more liquid phase at the high and medium air flow areas represented by quadrants 90a, 90c, the evaporator 90 has a third pass 120 which is comprised of four tubes 92 which contract the volume and flow area at the outlet of the evaporator 90. The restricted flow is from the tank 96 to the tank 98. Tank 98 has an outlet 122 therefrom adapted to be connected to the low pressure refrigerant vapor line of a refrigerant circuit in a motor vehicle air conditioning system of the type set forth in FIG. 1. The restriction in volume in the outlet pass 120 is selected so as to maintain a back pressure in the refrigerant flowing through the expanding volume represented by the passes 116, 118. As a consequence, there is a tendency to maintain more liquid refrigerant phase in the quadrants 90a, 90c having higher air flow thereacross which results in more energy loss from the higher rate regions of the uneven air flow pattern across the evaporator 90.

The evaporator 90 of the present invention solves the problem of hot spots in an evaporator having insufficient liquid refrigerant phase to cool the higher rate air flow portions of an uneven inlet air distribution to the inlet side of the evaporator 90 with resultant higher air flow temperatures at different regions of the exit side of the evaporator.

More particularly, the contracting refrigerant flow volume at the outlet of the evaporator 90 is selected and arranged with respect to the uneven air flow patterns through the evaporator to even the cooling of the air flow patterns by locating more liquid refrigerant phase at the higher flow rate portions 90a, 90c and thereby produces a more uniform outlet air temperature at the exit of the evaporator 90.

Figure 6:
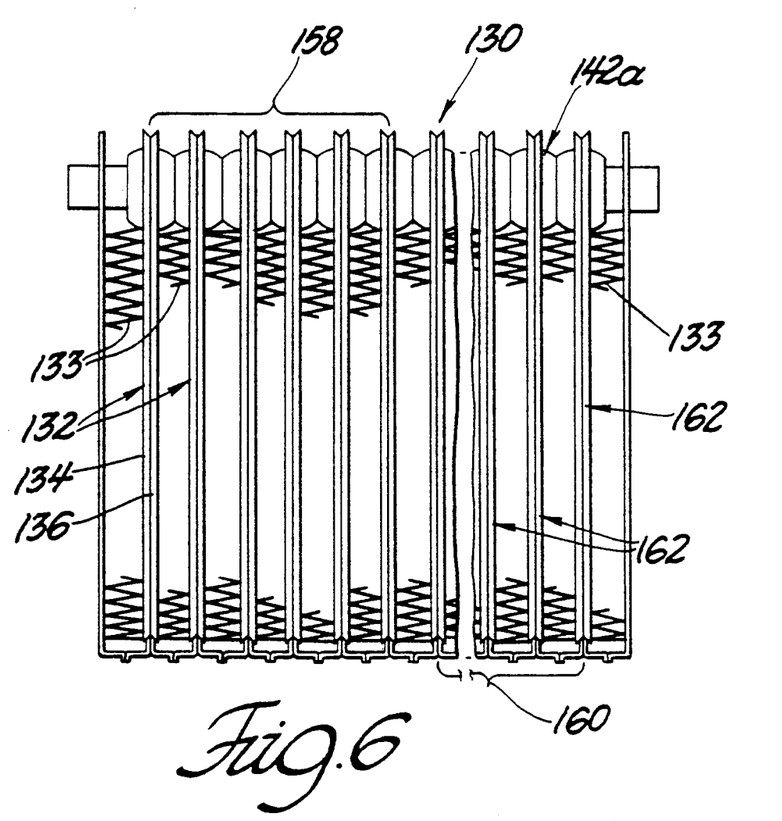
FIG. 6 is a front elevational view of another embodiment of the refrigerant evaporator of the present invention.
Figure 7:
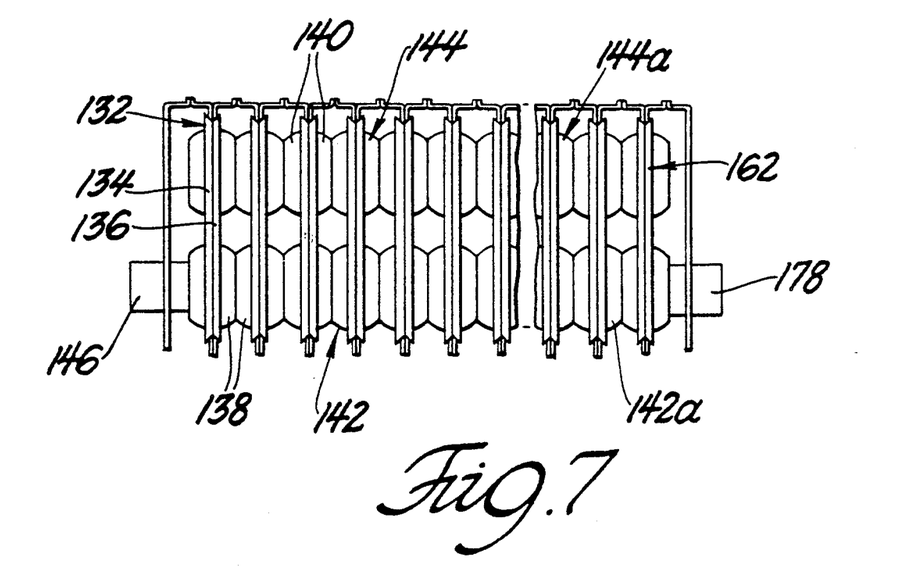
FIG. 7 is a top elevational view of the evaporator shown in FIG. 6.
Figure 8:
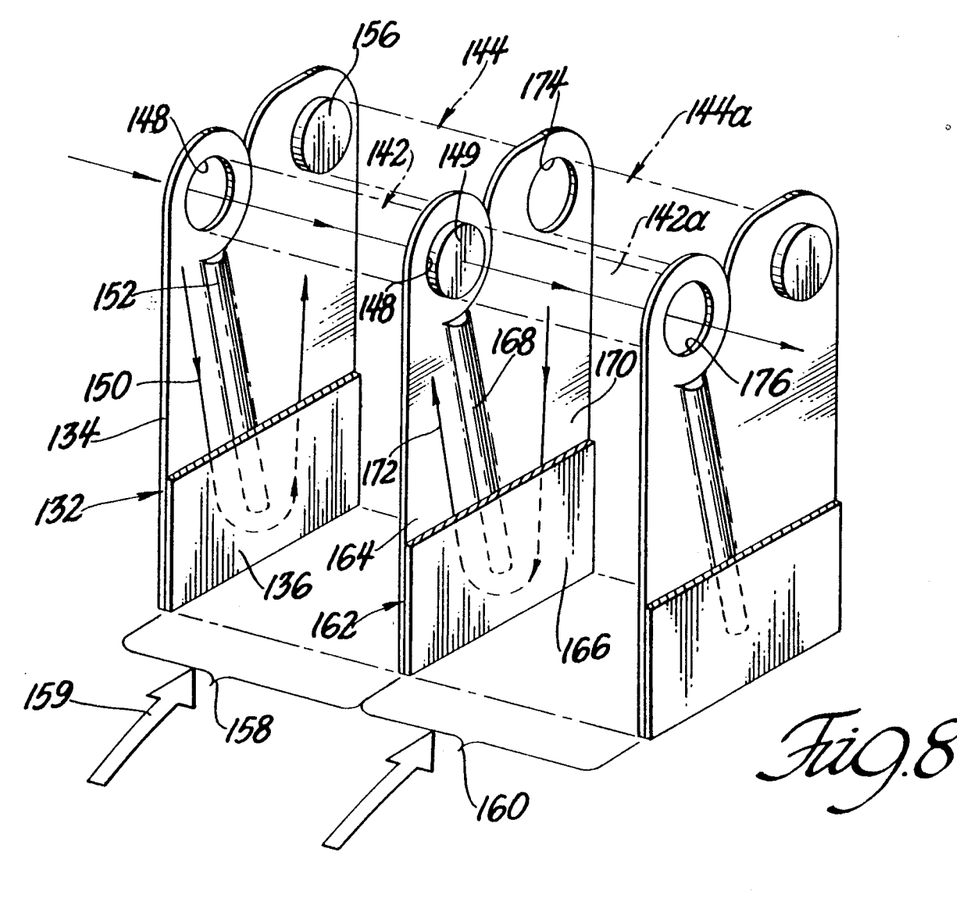
FIG. 8 is a diagrammatic view of the refrigerant flow pattern in the evaporator of FIGS. 6 and 7.

In another embodiment of the invention shown in FIGS. 6-8, contraction is provided at the outlet pass in an evaporator 130 comprised of U-flow, flat tubes 132 with air centers 133 therebetween. Each tube 132 is fabricated from a pair of mating core plates exemplified by inner core plate 134 and outer core plate 136 shown in detail in FIGS. 6-8. The core plates 134, 136 are made from stampings of thin aluminum sheet or other suitable heat transfer material (as are the plates in the embodiment of FIGS. 2-4 and 5). The plates 134, 136 are generally rectangular in plan view with rounded corners. The upper ends of plates 134, 136 are formed as generally conical and truncated protuberances 138, 140 that join to form a pair of side tanks 142, 144 for flow of refrigerant in either liquid phase or liquid/vapor phase through the tubes 132. According to the present invention the evaporator 130 has an inlet 146 into the tank 142. As shown in FIG. 8, it communicates with inlet openings 148 formed in each of the tubes 132 for flow through an expanding refrigerant flow passage 150 formed in each of the tubes 132 on one side of a raised divider rib 152 on each of the plates 134, 136. The divider rib 152 is located off-center of the tube to form the flow passage 150 and a second outlet passage 154 which communicates with a closed outlet opening 156 to the tank 144. An inlet opening 148 in a tube 132a is closed by a plug 149, similar to plugs 83, 85, to define a first pass 158 including six tubes 132 (one of which is shown in FIG. 8) that combine to form an expanding refrigerant volume at the air side 159 of the evaporator 130 which has the greatest air flow rate thereacross. The evaporator 130 further includes a second pass 160 comprised of seven tubes 162 (two of which are shown in FIG. 8) formed of plates 164, 166 joined at their peripheries and each including a divider rib 168 which defines two spaced, series arranged refrigerant passages 170, 172 in each of the tubes 162 which contract in volume between an inlet opening 174 and an outlet 176 at either end of tank segments 144a, 142a (FIG. 7) forming the inlet side and outlet sides of the second pass 160. The second pass 160 is connected to the evaporator outlet 178. The contracting volume passages 170, 172 produce a back pressure on the first refrigerant pass 158 so as to retain more liquid phase refrigerant therein for providing a greater loss of energy in the first refrigerant pass to cool the greater air flow portion of the evaporator 130 thereby to even the temperature of the air flow exiting the evaporator 130 prior to its entry into the passenger compartment of the motor vehicle.

While the above description constitutes preferred embodiments of the invention, it will be appreciated that the invention can be modified and varied without departing from the scope and fair meaning of the accompanying claims.

What is claimed is:

1. An air conditioning ventilation unit for a motor vehicle having a refrigerant system including a liquid refrigerant conduit adapted to be connected to the inlet of a refrigerant evaporator and a low pressure refrigerant vapor conduit adapted to connect the outlet of the evaporator to the inlet of a mechanical refrigerant compressor and further including an air blower for directing air flow across the evaporator which includes an inlet face with an uneven air flow pattern thereacross including a higher air flow portion and a lesser air flow portion the improvement comprising:

an evaporator core having an inlet fitting adapted to be connected to the low pressure liquid conduit of the air conditioning and an outlet adapted to be connected to the low pressure refrigerant vapor conduit;

said evaporator core including first tube pass means forming an expanding volume passage for flow of refrigerant with respect to the higher air flow portion and a second tube pass means in series flow relationship with said first tube pass means forming a contracting volume passage for directing a back pressure on said first tube pass means for retaining liquid phase refrigerant within said first tube pass so as to increase the loss of heat energy from the higher volume air flow portion.

2. The air conditioning ventilation unit of claim 1 wherein said first tube pass means include flat tubes having either an inlet opening at one end and an outlet opening at the opposite end or U-flow passages having an inlet opening and an outlet opening at the same end of the flat tube.

3. The air conditioning ventilation unit of claim 1 further characterized by said first refrigerant pass means having three refrigerant flow passes including a first set of tubes formed in parallel; a second set of tubes formed in parallel to define an expanding refrigerant volume in series flow relationship with said firs set of tubes and a third set of tubes formed in parallel to define a contracting refrigerant volume in series flow relationship with said second set of tubes for retaining liquid phase refrigerant within said first set of tubes so as to increase the loss of heat energy from the higher volume air flow portion.

4. In the air conditioning ventilation unit of claim 1 said refrigerant pass means including a first set of U-flow plate tube passes having a refrigerant flow path which expands between the inlet and outlet openings therein to reduce pressure drop and a second set of U-flow plate tube passes having a refrigerant flow path which contracts between the inlet and outlet openings of the U-flow plate for retaining liquid phase refrigerant within said first set of U-flow plate tube pass so as to increase the loss of heat energy from the higher volume air flow portion.

5. An air conditioning ventilation unit for a motor vehicle having a refrigerant system including a liquid refrigerant conduit adapted to be connected to the inlet of a refrigerant evaporator and a low pressure refrigerant vapor conduit adapted to connect the outlet of the evaporator to the inlet of a mechanical refrigerant compressor and further including an air blower for directing air flow across the evaporator which includes a generally rectangular inlet face with an uneven air flow pattern thereacross including a higher air flow portion and a lesser air flow portion the improvement comprising:

an evaporator core having an inlet fitting adapted to be connected to the low pressure liquid conduit of the air conditioning and an outlet adapted to be connected to the low pressure refrigerant vapor conduit;

a first plurality of elongated plates having a first refrigerant pass having a first predetermined flow area for flow of liquid refrigerant with respect to both said higher and lower air flow portions of said inlet face;

and a second plurality of elongated plates having a second refrigerant pass smaller than said first predetermined flow area for refrigerant flow through said outlet and for producing a back pressure within said first refrigerant pass for retaining liquid phase refrigerant within said first refrigerant pass so as to increase the loss of heat energy from the higher volume air flow portion.

6. The air conditioning ventilation unit of claim 5 wherein said first and second plurality of elongated plates form flat tubes including either an inlet opening at one end and an outlet opening at the opposite end or U-flow passages having an inlet opening and an outlet opening at the same end of the flat tube.

7. An air conditioning ventilation unit for a motor vehicle having a refrigerant system including a liquid refrigerant conduit adapted to be connected to the inlet of a refrigerant evaporator and a low pressure refrigerant vapor conduit adapted to connect the outlet of the evaporator to the inlet of a mechanical refrigerant compressor and further including an air blower for directing air flow across the evaporator which includes a generally rectangular inlet face with an uneven air flow pattern thereacross including a higher air flow portion and a lesser air flow portion the improvement comprising:

an evaporator core having an inlet fitting adapted to be connected to the low pressure liquid conduit of the air conditioning and an outlet adapted to be connected to the low pressure refrigerant vapor conduit;

said evaporator core including refrigerant pass means for forming an expanding volume for flow of liquid refrigerant with respect to both said higher and lower air flow portions of said inlet face; and said refrigerant pass means further including means for contracting the refrigerant flow to produce a back pressure therein for retaining liquid phase refrigerant within said refrigerant pass means so as to increase the loss of heat energy from the higher volume air flow portion.

* * * * *